Jan. 20, 1970     C. J. CASALEGGI     3,490,597
COVER PLATE FOR SPIN-ON FILTER
Filed July 22, 1966
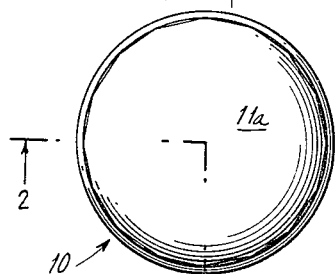
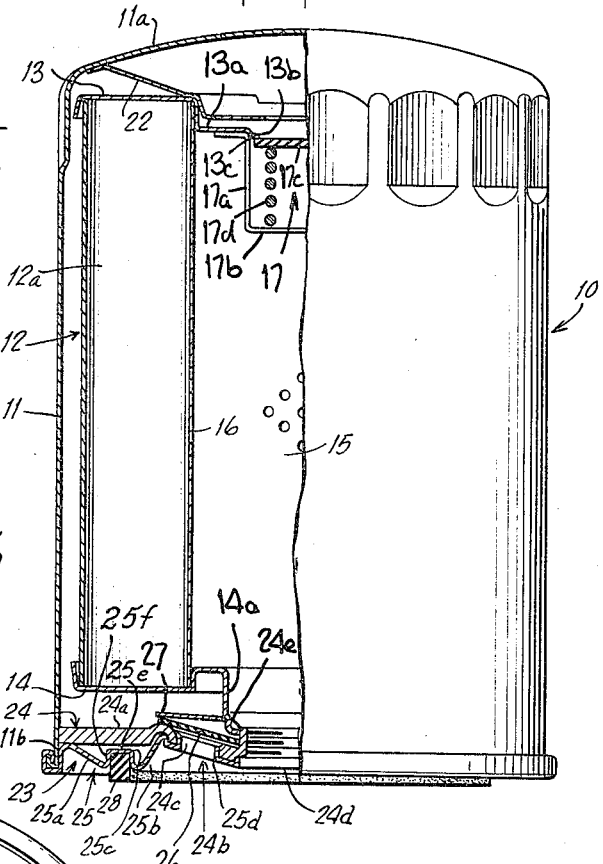
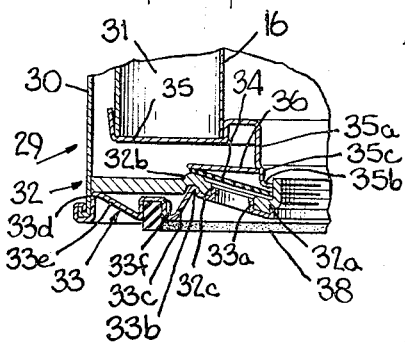
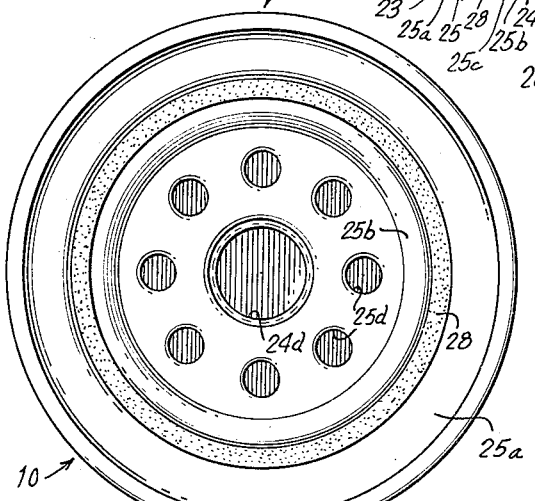
INVENTOR.
CHARLES J. CASALEGGI
BY
*Kenyon & Kenyon*
ATTORNEYS he# United States Patent Office 3,490,597
Patented Jan. 20, 1970

1

3,490,597
COVER PLATE FOR SPIN-ON FILTER
Charles J. Casaleggi, New Monmouth, N.J., assignor to Purolator Products, Inc., Rahway, N.J., a corporation of Delaware
Filed July 22, 1966, Ser. No. 567,140
Int. Cl. B01d 27/08
U.S. Cl. 210—443
8 Claims

ABSTRACT OF THE DISCLOSURE

A liquid filter is disclosed as including a housing having an open end portion, a filter element disposed in the housing and a central passage for receiving filtered liquid after passage through the element. A reinforcing plate is disposed adjacent the open end of the housing and includes a central outlet opening adapted to be connected to an outlet passage and at least one inlet opening disposed about the central outlet and adapted to be connected to an inlet passage for delivering fluid to be filtered to the housing. A cover plate overlies the outer surface of the reinforcing plate and includes an aperture in register with the reinforcing plate outlet and an aperture in register with each inlet opening in the reinforcing plate. Parts of the cover plate and reinforcing plate are in contact with each other to provide a friction contact between the plates to hold the plates together.

---

This invention relates to a liquid filter of the spin-on type and more in particular to the cover plate for the housing of the filter.

Liquid filters of the spin-on type are commonly used as oil filters for internal combustion engines. Since the filter is subjected to relatively high engine oil pressure, forces are developed which tend to separate the filter from the engine as well as the housing of the filter from its cover plate. In the conventional construction of spin-on filters, a central outlet opening is surrounded by a plurality of inlet openings. Consequently it becomes necessary to seal the periphery of the housing which surrounds the inlet openings. The cover construction for the housing must therefore provide both the means for mounting the filter on the engine and the means for mounting the gasket which seals the filter to the engine.

In various filter constructions it has been common practice to provide a reinforcing plate of comparatively heavy gauge metal to act as a supporting member for the cover plate of the housing and for attaching the housing to the engine. In order to secure the heavy reinforcing plate to the open end portion of the housing which is of a comparatively thin gauge material and in order to facilitate mounting of the annular sealing gasket, cover plates which also have a comparatively thin gauge are commonly welded to the reinforcing plate. The welding operation increases the cost of manufacturing the filter and the thin cover in many instances has the undesired effect of burning or marring the appearance of the exposed surface of the cover plate of the completed filter.

Another function of the cover plate is to mount the annular sealing gasket with respect to the reinforcing plate. The mounting has previously been done in a rigid manner with the result that imperfections or distortions in the mounting surface of the engine can result in poor engagement of the gasket and the possibility of leakage.

It is therefore one of the objects of the invention to provide a spin-on liquid filter having a cover assembly in which the cover plate is secured to the reinforcing plate without the need of welding the two members together.

It is another object of the invention to mechanically engage the cover plate to the reinforcing plate.

2

It is an additional object of the invention to support the sealing gasket in a manner which can accommodate a degree of misalignment between the filter and the surface upon which it is mounted.

It is a further object of the invention to provide a spin-on liquid filter in which the cover plate completely extends across all portions of the reinforcing plate.

It is also an object of the invention to attach the cover plates to the reinforcing plate in a manner which does not disfigure the appearance of the exposed portion of the cover plate.

One embodiment of the invention is adapted to be used with a filter which includes a housing having an open end portion. A filter element having a central passage for receiving filtered liquid after passage therethrough is disposed in the housing. A reinforcing plate is disposed adjacent to the open end portion of the housing and is provided with a central outlet opening which is adapted to be connected to an outlet passage. The central opening is adapted to receive filtered liquid from the central passage of the filter element. The reinforcing plate is provided with at least one inlet opening disposed about the central outlet opening therein and is adapted to be connected to an inlet passage for delivering fluid to be filtered to the region between the filter element and the housing. In accordance with the invention, there is provided a cover plate which overlies the outer surface of the reinforcing plate and is connected about its periphery to the open end portion of the housing. The cover plate has an aperture in register with the central outlet opening of the reinforcing plate and an additional aperture in register with each inlet opening in the reinforcing plate. There is also provided a gasket disposed upon the cover plate about the additional aperture for sealing it with respect to the inlet passage. With this arrangement the cover plate can be secured to the reinforcing plate by its engagement with inlet openings in the reinforcing plate and as a result the need for welds between the cover plate and the reinforcing plate are eliminated.

In another embodiment of the invention there is provided a tubular member extending from about the additional aperture in the cover plate and disposed in engagement with the inner surface of the inlet opening of the reinforcing plate. With this construction the engagement of the cover plate to the reinforcing plate is increased and the additional apertures in the cover plate are enabled to provide the dual function of furnishing apertures for the inlet openings and means for attaching the cover plate to the reinforcing plate.

In an additional embodiment of the invention the cover plate is provided with structure forming a groove facing away from the cover plate and extending about its additional aperture. Furthermore the groove-forming structure is spaced apart from the portion of the reinforcing plate adjacent thereto. As a result, the gasket disposed in the groove can deflect the cover plate when force is applied to the gasket as it is sealed to a mounting surface.

In a further embodiment of the invention the structure forming the groove for receiving the gasket includes inner and outer bands which are substantially of a fruto-conical form. The bands engage a channel-shaped member which in turn receive the gasket. With this arangement the bands provide flexible support for the gasket and thereby accommodate movement of the gasket with respect to the reinforcing plate.

These and other objects and advantages of the invention appear more fully in the following detailed decription taken in conjunction with the accompanying drawings in which:

FIG. 1 is a plan view of the closed end portion of the filter of the invention;

FIG. 2 is a broken vertical section view taken along the line 2—2 in FIG. 1 and showing the cover assembly of the invention;

FIG. 3 is a bottom view of the filter showing the cover assembly of the invention; and FIG. 4 is a fragmentary vertical section view of the details of the cover plate of the invention.

Filter 10 of the invention (FIGS. 1 and 2) includes housing 11 having closed end portion 11a and open end portion 11b. Housing 11 is adapted to receive filter elements 12 which can be formed of a plurality of pleats 12a of filter paper as shown in U.S. Patent No. 2,663,660, issued on Dec. 22, 1953 for "Method of Assembling Filter Elements." Pleats 12a of the filter paper are mounted between end caps 13 and 14 and are sealed with respect to the end caps by a suitable compound such as in accordance with the method recited in the above-cited U.S. patent. The pleats are arranged in an annular manner about central passage or opening 15. In order to provide support for the pleats and a connection between the end caps, perforated tube 16 is provided. In addition to being perforated, tube 16 can be corrugated by a plurality of circumferential ridges and grooves (not shown). By placing the perforations in the groove which extend into central opening 15, the pleats are bridged over the perforations and are prevented from closing them. The filter element is adapted to receive a flow of liquid to be filtered which passes inwardly through pleats 12a and through the perforations in tube 16 toward central opening 15.

End cap 13 includes an annular flange member 13a which is adapted to fit within the inner surface of tube 16. Upon the flange member there is mounted U-shaped valve housing 17a which terminates in end portion 17b of pressure relief valve 17. Valve opening 13b in flange member 13a is adjacent annular valve seat 13c of pressure relief valve 17 which is adjacent to valve seat 13c. Valve 17 includes valve member or disc 17c which is urged against seat 13c by spring 17d. Spring 17d is supported by end portion 17b of housing 17a which is shown only in section in FIG. 2. With this arrangement of the control valve it can be seen that disc 17c is normally held in a closed position with respect to seat 13c.

Upon assembly of filter 10, filter element 12 is placed inside of housing 11 and end cap 13 is advanced into engagement with cantilever strip spring 22 which is adapted to apply a downward force upon end cap 13 viewed in FIG. 2. The spring can be provided with opening 22a to provide an unobstructed flow path to valve 17. Open end portion 11b of the housing, after insertion of the element, is closed by cover assembly 23 which includes reinforcing plate 24 and cover plate 25. The outer peripheral portion 24a of reinforcing plate 24 is formed from substantially thick gauge metal and has a substantially rectangular cross-section. Inner portion 24b of the reinforcing plate is convex with respect to housing 11 and contains a plurality of inlet openings 24c. In the central portion of the reinforcing plate there is provided threaded coupling 24d which projects toward the interior of the housing. The interior of the coupling provides an outlet opening which is adapted to engage an outlet passage to which the filter is to be connected.

Cover plate 25 includes outer band 25a, inner band 25b and channel 25c supported by the bands therebetween. Channel 25c is defined by base portion 25e and side portions 25f. Each of the bands has a substantially frustoconical form and is attached to a respective side portion of channel 25c at the parts of the side portions furthest away from the base portion to extend from the side portions at their point of attachment to the side portions inwardly and radially towards the interior of the housing. As shown in FIG. 2, the bands support channel 25c at a distance from reinforcing plate 24. Cover plate 25 further includes a plurality of tubular members 25d which are adapted to extend into each of inlet openings 24c in the reinforcing plate. In fabricating cover assembly 23, tubular members 25d can be flared into openings 24c so that the cover plate becomes rigidly attached to the reinforcing plate. Prior to assembly, the surface of reinforcing plate 24 adjacent to inner band 25b can be treated with a sealing compound to prevent any leakage in an outward radial direction between the reinforcing plate and the cover plate. The mechanical attachment of the cover plate to the reinforcing plate provided by the engagement of tubular members 25d with opening 24c eliminates the need of any welds. Consequently the cover plate is safeguarded against the discolorations and disfigurement which welding would produce.

Prior to attachment of the cover assembly 23 to the housing, anti-drain back valve disc 26 of a flexible material is mounted about outer surface 24e of coupling 24d so that the disc extends over the openings formed by tubular portions 25d and the upper surface of outer portion 24a of the reinforcing plate. Diaphragm spring 27 which extends radially from conduit 14a is adapted to apply a closure force to disc 26 so that it normally remains in a closed position in contact with the reinforcing plate. Conduit 14a at the lower portion thereof as shown in FIG. 2 is piloted by upset portions (not shown) of surface 24e which extends in an outward radial direction. In addition the lower portion of conduit 14a clamps the inner portion of disc 26 against coupling 24d.

With the cover assembly 23 in position on housing 11, the outer periphery of cover plate 25 and the outer periphery of open end portion 11b of the housing are formed into a rolled joint. It is sufficient for the cover plate to be formed from relatively thin material, for example, material having a gauge of approximately .023 inch, since the rolled joint enables the thin cover plate to secure the relatively thick reinforcing plate having, for example, a gauge of approximately .115 inch to the housing. As a result of this construction the reinforcing plate is mounted with respect to the housing so that it can withstand the internal pressure within the filter which tends to separate the housing from the cover assembly and the entire filter from the outlet connection at coupling 24d.

Gasket 28 of resilient material is mounted in channel 25c which forms a groove which substantially fits the gasket. Upon mounting the spin-on filter, coupling 24d is engaged with the outlet passage on the engine or the like and gasket 28 is brought into engagement with the surface of the engine or the like which contains the inlet passage for delivering fluid to the filter. In case of any misalignment or distortion of mounting surface of the engine, channel 25c can be deflected with respect to reinforcing plate 24 as a result of the resilient support of the channel furnished by the inner and outer bands 25b and 25a, respectively. Thus both the resilient property of gasket 28 and the resilient support of cover plate 25 serve to insure a tight fit of the filter about the inlet passage of the engine.

During operation flow from the inlet passage of the engine enters the filter by way of the openings of tubular members 25d of the cover plate. The incoming liquid deflects anti-drain back disc 26 upwardly as viewed in FIG. 2 against the restraint of spring 27. The incoming liquid then passes around end cap 14 and through pleats 12a of the filter element which serves to remove contaminants from the liquid. After passing through the pleats the liquid continues through openings in tube 16 and then moves downwardly as viewed in FIG. 2, through the opening of conduit 14a toward coupling 24d which contains the outlet opening adapted to be connected to the oulet passage of the engine.

Pressure relief valve 17 is provided with spring 17a having a predetermined closing force which will enable valve seal 17c to open at a relief pressure condition. By way of example, the relief valve can be conditioned to open at approximately 8 to 10 p.s.i. In this way the opening of the relief valve insures a steady flow of liquid to the inlet opening even though the portion of the liquid flowing through the relief valve is not filtered. In addition the relief valve serves to insure the steady flow of liquid under abnormal conditions such as those accompanying very low ambient temperatures which could increase the viscosity of the oil in the filter housing to the point that it cannot pass through filter element 12 or filter material 19 without an excessive pressure drop.

The construction of cover plate 25 enables it to be securely engaged with reinforcing plate 24 and in turn engaged with the filter housing for providing a strong and tight closure of the open end portion of the filter housing. In addition the cover plate, by virtue of the frusto-conical bands, is enabled to provide a sufficiently resilient mount for gasket 28 so that the filter can be tightly sealed even though there is distortion or a tolerance accumulation between the filter and the surface of the engine upon which it is mounted. The cover plate assembly contributes to the compact nature of the filter and also facilitates its manufacture since the cover plate can be attached to the reinforcing plate by merely mechanical engagement and thus the need for welds or other related attaching techniques is eliminated.

In another view of the invention as shown in FIG. 4, filter 29 includes housing 30 in which is mounted filter element 31. The open end of the filter housing is closed by means of reinforcing plate 32 and cover plate 33. Reinforcing plate 32 which substantially corresponds to reinforcing plate 24 of filter 10 is provided with coupling 32a for connection to the passage on the engine which is intended to receive filtered oil. In addition reinforcing plate 32 includes annular portion or valve seat 32b disposed on the inner surface of the reinforcing plate facing the filter element. The peripheral portion of anti-drain back valve disc 34 bears upon valve seat 32b. The valve disc extends in a radial outwardly extending direction from coupling 32a. Disc 34 thus is adapted to cover the inlet openings 33a of the cover plate which project into openings 32c of the reinforcing plate.

End cap 35 which closes the end of filter element 31 also serves to support it with respect to coupling 32a. Thus the end cap is provided with conduit 35a which engages the coupling. Flange 35b of the end cap serves to position the inner portion of valve disc 34 with respect to the coupling. Conduit 35a also includes shoulder 35c about which is mounted spring 36 which can be of the diaphragm type.

The function of spring 36 is to bias the peripheral portion of valve disc 34 into a sealing engagement with valve seat 32b. The conically deflected form of valve disc 34 alone serves to urge it against valve seat 32b. The provision of spring 36 applies an additional closing force to the disc which forms a more positive seal with respect to the valve seat. Since the spring projects in a substantially radial direction from shoulder 35c a clearance is provided between the inner portion of the spring and the valve disc. As a result of this construction, the engagement of the spring with the valve disc is confined to the outer peripheral portion of the disc and in this way a tight seal is insured. At the same time the clearance between the spring and the disc serves to accommodate the upward deflection of the disc as shown in FIG. 4 when the disc is in the open position.

The outer surface of reinforcing plate 32 is provided with annular groove 37 which is substantially in register with seat 32b on the opposite surface of the reinforcement plate. Groove 37 is adapted to receive the inner rim portion 33b of inner band 33c of the cover plate. Rim 33b of outer band 33e of the cover plate engages the reinforcing plate and the portion of the housing adjacent thereto. As a result it can be seen, as shown in FIG. 4, that the inner and outer bands 33c and 33e, respectively, are supported against movement in the radial direction as load is applied to gasket 38 during the installation of the filter. Notwithstanding the rigid support of the inner and outer bands, the comparatively thin gauge of the bands enable channel 33f in which the gasket is disposed to be deflected inwardly toward the reinforcing plate. In this way a tight seal can be formed even though there is a limited degree of misalignment between the cover plate and the surface upon which the gasket is to bear.

What is claimed is:

1. In a spin-on liquid filter including a housing having an open end portion, a filter element disposed in the housing and having a central passage for receiving filtered liquid after passage through the element, and a reinforcing plate disposed adjacent to the open end portion of the housing and having a central outlet opening adapted to be connected to an outlet passage, the central opening being adapted to receive filtered liquid from the central passage of the filter element, the reinforcing plate having at least one inlet opening disposed about the central outlet opening therein and adapted to be connected to an inlet passage for delivering fluid to be filtered to the region between the filter element and the housing, the improvement comprising a cover plate overlying the outer surface of the reinforcing plate and connected about the periphery of said cover plate to the open end portion of the housing and integrally attached thereto, a central portion of said cover plate defining an aperture in register with the central outlet opening of the reinforcing plate and a first annular portion of said cover plate defining an additional aperture in register with each inlet opening in the reinforcing plate, the inner portion of said first annular portion of said cover plate being in engagement with said reinforcing plate to hold said cover and reinforcing plates fast to each other, a second annular portion of said cover plate having a surface disposed outwardly about said first annular portion and a gasket disposed thereupon for sealing said additional aperture with respect to the inlet passage, the second annular portion of said cover plate upon which said gasket is disposed being spaced apart from said reinforcing plate to enable said cover plate to deflect towards said reinforcing plate upon the application of force to said gasket when sealing said additional passage with respect to said inlet passage.

2. A device in accordance with claim 1 in which said cover plate further comprises a tubular member extending from about said additional aperture, said tubular member being flared in engagement with the inner surface of the inlet opening of the reinforcing plate.

3. A device in accordance with claim 1 wherein said cover plate includes structure forming a channel facing away from said reinforcing plate and extending about said additional aperture, said channel-forming structure being spaced apart from the portion of the reinforcing plate adjacent thereto, and said gasket disposed in said channel, whereby the distance between said channel-forming structure and said reinforcing plate enables said channel-forming structure to deflect toward the reinforcing plate upon the application of force to said gasket when sealing said additional aperture with respect to the inlet passage.

4. A device in accordance with claim 3 in which said structure forming a channel facing away from said reinforcing plate and extending about said additional aperture comprises an inner annular band extending radially outwardly from adjacent the inlet opening in said cover plate and away from the reinforcing plate, an outer annular band extending radially inwardly from adjacent the periphery of said cover plate and away from the reinforcing plate, and an annular channel-shaped member having an opening facing away from said reinforcing plate and having a base portion disposed at a distance from the reinforcing plate, said channel-shaped member also including oppositely disposed spaced apart side portions extending therefrom, each of said side portions being connected at the part of said side portions furthest away from said base portion to one of said inner and outer bands, respectively, at the extremities of said inner and outer bands away from the reinforcing plate.

5. In a spin-on liquid filter including a housing having an open end portion, a filter element disposed in the housing and having a central passage for receiving filtered liquid after passage through the element, and a reinforcing plate disposed adjacent to the open end portion of the housing and having a central convex portion extending away from the interior of the housing and a substantially flat peripheral portion disposed about the central portion, the central portion having an outlet opening adapted to be connected to an outlet passage and at least one inlet opening disposed about the outlet opening and adapted to be connected to an inlet passage, the outlet opening being adapted to receive filtered liquid from the central passage of the filter element and the inlet opening being adapted to deliver fluid to be filtered to the region between the filter element and the housing, the improvement comprising a cover plate overlying and having portions thereof substantially contiguous with the outer surface of the reinforcing plate and connected about the periphery of said cover plate to the open end portion of the housing, said cover plate having an aperture in register with the outlet opening of the reinforcing plate and said cover plate having an additional aperture in register with each inlet opening in the reinforcing plate, said cover plate having structure forming a channel facing away from said reinforcing plate and extending about said additional aperture, said channel-forming structure being spaced apart from the portion of the reinforcing plate adjacent thereto, and a gasket disposed in said channel for sealing said additional aperture with respect to the inlet passage, whereby the distance between said channel-forming structure and said reinforcing plate enables said channel-forming structure to deflect toward the reinforcing plate upon the application of force to said gasket when sealing said additional aperture with respect to the inlet passage.

6. Apparatus according to claim 5 further defined by the part of said cover plate adjacent the cover plate aperture which is in register with the outlet opening of said reinforcing plate being in contact with said reinforcing plate to provide friction for holding the cover plate and reinforcing plate secured to each other.

7. A device in accordance with claim 5 in which said structure forming a channel facing away from said reinforcing plate and extending about said additional aperture comprises an inner annular band extending radially outwardly from adjacent the inlet opening in said cover plate and away from the reinforcing plate, an outer annular band extending radially inwardly from adjacent the periphery of said cover plate and away from the reinforcing plate, and an annular channel-shaped member having an opening facing away from sid reinforcing plate and having a base portion disposed at a distance from the reinforcing plate, said channel-shaped member also including oppositely disposed spaced apart side portions extending therefrom, each of said side portions being connected at the part of said side portions furthest away from said base portion to one of said inner and outer bands, respectively, at the extremities of said inner and outer bands away from the reinforcing plate.

8. A device in accordance with claim 7 wherein said reinforcing plate includes an annular portion facing the interior of the housing surrounding said central outlet opening and said inlet opening, said annular portion closer radially to said central outlet than said gasket, an antidrain back valve disc extending in a radial direction toward the periphery of said reinforcing plate and overlying said inlet opening and said annular portion, said reinforcing plate including an annular concave portion facing away from the interior of the housing and receiving a portion of said inner band.

References Cited

UNITED STATES PATENTS

| | | | |
|---|---|---|---|
| 3,232,437 | 2/1966 | Hultgren | 210—440 |
| 3,235,085 | 2/1966 | Humbert | 210—130 |
| 3,315,808 | 4/1967 | Hopkins | 210—130 |

OTHER REFERENCES

Laughner, V., Hargan, D.; Handbook of Fastening and Joining Metal Parts, p. 1A, 218, McGraw-Hill (1956).

REUBEN FRIEDMAN, Primary Examiner

T. A. GRANGER, Assistant Examiner